(12) United States Patent
Johnson

(10) Patent No.: US 8,805,593 B2
(45) Date of Patent: Aug. 12, 2014

(54) FAULT TOLERANT ANALOG OUTPUTS FOR TURBO COMPRESSORS

(75) Inventor: Gregory D. Johnson, Urbandale, IA (US)

(73) Assignee: Energy Control Technologies, Inc., Urbandale, IA (US)

( * ) Notice: Subject to any disclaimer, the term of this patent is extended or adjusted under 35 U.S.C. 154(b) by 928 days.

(21) Appl. No.: 12/949,304

(22) Filed: Nov. 18, 2010

(65) Prior Publication Data

US 2011/0113788 A1 May 19, 2011

Related U.S. Application Data

(60) Provisional application No. 61/262,235, filed on Nov. 18, 2009.

(51) Int. Cl.
*G06F 19/00* (2011.01)
*G05B 19/05* (2006.01)

(52) U.S. Cl.
CPC .... *G05B 19/058* (2013.01); *G05B 2219/14015* (2013.01); *G05B 2219/14019* (2013.01)
USPC ................. 700/286; 700/23; 60/793

(58) Field of Classification Search
USPC ........... 700/282, 23, 20, 42; 60/793; 415/17.2
See application file for complete search history.

(56) References Cited

U.S. PATENT DOCUMENTS

| 4,015,246 | A | | 3/1977 | Hopkins, Jr. et al. |
| 4,334,822 | A | * | 6/1982 | Rossmann .................... 415/113 |
| 4,652,417 | A | | 3/1987 | Sutherland et al. |
| 4,794,755 | A | * | 1/1989 | Hutto et al. ................ 60/39.281 |
| 4,868,826 | A | | 9/1989 | Smith et al. |
| 5,394,689 | A | * | 3/1995 | D'Onofrio ...................... 60/204 |
| 5,424,898 | A | | 6/1995 | Larson et al. |
| 5,508,910 | A | | 4/1996 | Diehl |
| 5,613,064 | A | * | 3/1997 | Curtin .......................... 714/47.1 |
| 6,047,222 | A | * | 4/2000 | Burns et al. .................... 700/79 |
| 6,078,488 | A | | 6/2000 | Gunion |
| 6,568,166 | B2 | * | 5/2003 | Jay et al. .................... 60/39.281 |
| 6,914,344 | B2 | * | 7/2005 | Franchet et al. ................ 290/52 |
| 7,159,401 | B1 | * | 1/2007 | Kurtz et al. .................... 60/772 |
| 2004/0060371 | A1 | * | 4/2004 | Barkhoudarian ........ 73/862.331 |

* cited by examiner

*Primary Examiner* — Kidest Bahta
(74) *Attorney, Agent, or Firm* — Zarley Law Firm, P.L.C.

(57) ABSTRACT

A control system for operating a device in a turbo machine system. The system includes a first programmable logic control device producing an analog output signal and a relay circuit electrically connected to the first programmable logic control device to receive the analog output signal. A field device is electrically connected to the relay circuit to receive the analog output signal to operate based on the analog output signal to provide a load. In addition, the relay circuit is electrically connected to a second programmable logic control device to communicate the analog output signal to the second programmable logic control device to monitor the analog output signal.

12 Claims, 2 Drawing Sheets

FAULT TOLERANT ANALOG OUTPUTS FOR TURBO COMPRESSORS

CROSS REFERENCE TO RELATED APPLICATION

This application claims the benefit of U.S. Provisional Application No. 61/262,235 filed Nov. 18, 2009.

BACKGROUND OF THE INVENTION

The present invention is directed toward control systems. More specifically, this invention is directed to a control system for turbo machinery.

Turbo machinery such as compressor systems like that seen in FIG. 1 of U.S. Pat. No. 5,798,941 that is incorporated herewith have been around for many years. Typically, a complex control system is used in order to control a recycling valve that regulates fluid flow to a compressor. Industrial control systems including turbo machinery control systems use methods of reading inputs and calculating control response. These responses are often analog signals that need to be sent to a control device. The control signal sent to the control device (in the case of turbo machinery control systems is typically the valve) is an analog current signal typically ranging from 4-20 mA. This analog signal is critical to the proper operation of the compressor surge controller.

The present invention relates in general to an electrical network where analog control signals are used to modulate a valve, pump or motor and more specifically the use of this analog network to control such devices in a turbo machinery system. Many turbo machinery control systems require that the input and output signals be highly reliable. The previous methods have included: (1) using redundant inputs but leaving the analog outputs as simplex; (2) using redundant analog outputs in parallel and wired through an electromechanical relay. The electromechanical relay is switched to allow either controller A or controller B to be driving the device; (3) Other more complex methods have been used to create feedback methods and diagnostics to monitor the signal to the field and the backup signal as best shown in U.S. Pat. No. 4,652,417.

Despite these solutions problems remain. The use of simplex analog outputs is a low cost solution but does not provide any level of fault tolerance in the case of electronic component failures in the analog output circuitry. The use of electromechanical relays to switch between the analog signals is a more reliable solution, but has the problem of not being able to correctly determine when an output channel has failed. These methods use feedback signals from the analog output that are measured before the field load device as best seen in U.S. Pat. No. 5,508,910. If the failure of the analog output circuit is such that the analog signal is grounded before the field load, but after the feedback measurement, then the circuit will fail to identify the failure.

Thus, a principal object of the present invention is to provide a redundant analog output signal to a field device.

Yet another object of the present invention is to utilize standard PLC components to provide a reliable output system.

Yet another object of the present invention is to detect failures that occur after loading in a compressor system.

These and other objects, features, or advantages of the present invention will become apparent from the specification and claims.

BRIEF SUMMARY OF THE INVENTION

A control system for operating a device in a turbo machine system. The control system includes a first programmable logic control device that produces an analog output signal. A relay circuit is electrically connected to the first programmable logic control device and receives the analog output signal in order to relay the signal to both a field device and a second programmable logic control device. The second programmable logic control device is used to monitor the analog output signal for faults including monitoring a signal after a load has been provided by the field device.

DESCRIPTION OF THE PREFERRED EMBODIMENT

Figure 1:
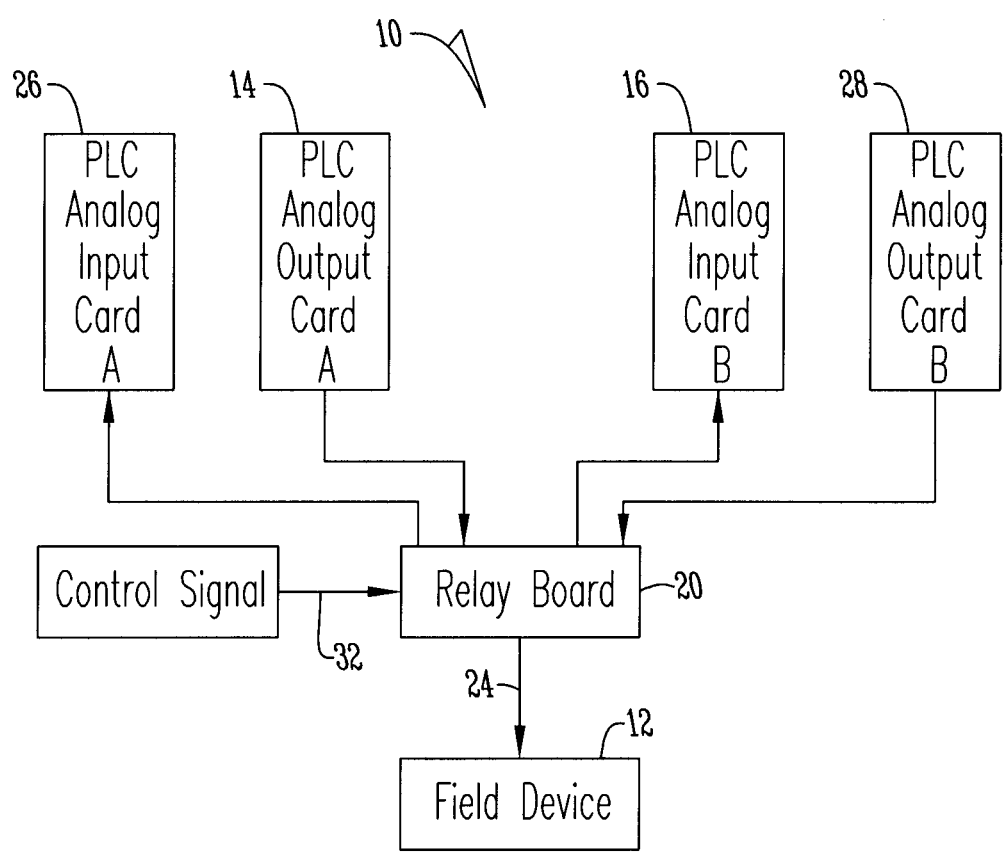
FIG. 1 is a schematic diagram of a control system for operating a device in a turbo machine system.
Figure 2:
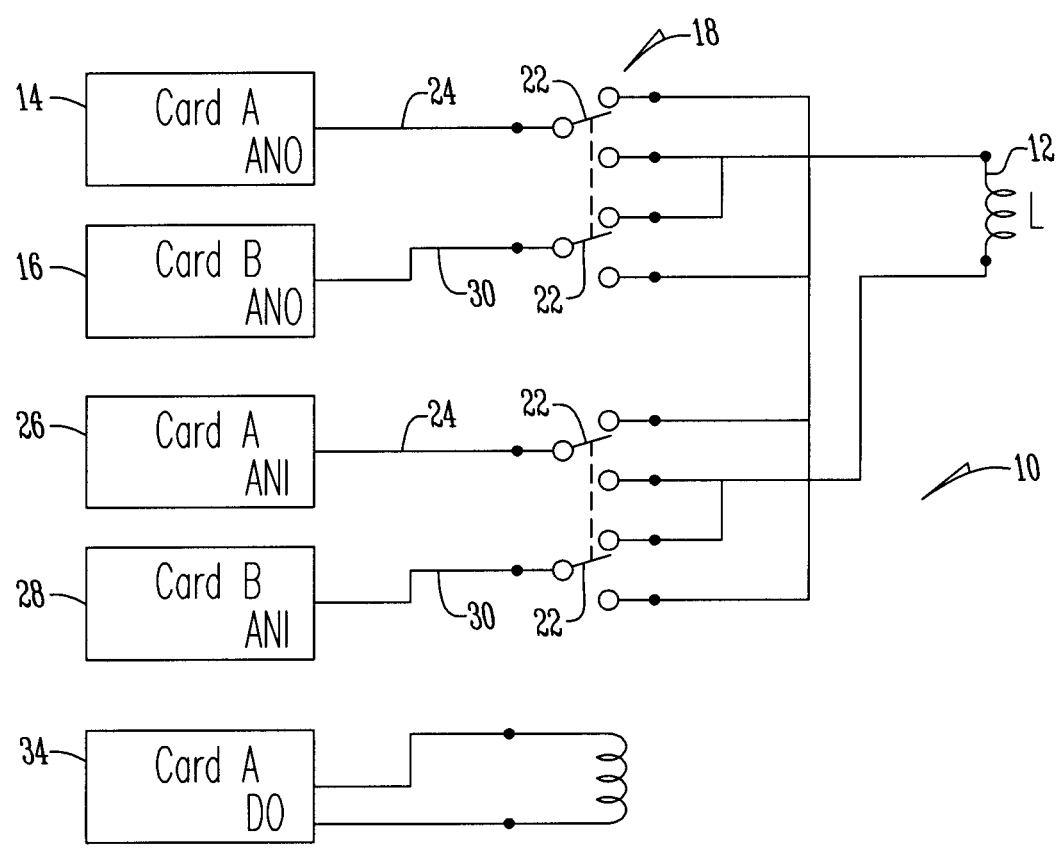
FIG. 2 is a schematic diagram of a control system for operating a device in a turbo machine system.

The figures show a control system 10 for operating a control or field device 12. In a preferred embodiment the control device is a valve of a compressor as is known in the art as shown in FIG. 1 of U.S. Pat. No. 5,798,941. While preferably this system 10 is used in association with the recycle valve in a compressor, the control system 10 may be used for other applications in order to control a controlled device without falling outside the scope of this disclosure.

The control system 10 produces a first analog output by utilizing first and second PLC (programmable logic control) devices 14 and 26 such as cards A and B that via a relay circuit 18 on a relay board 20 through a plurality of switches 22 sends an analog output signal 24 to the control device or load 12. Simultaneously, a second analog output is sent as a result of first and second backup PLC devices 16 and 28 such as cards A and B that through the relay circuit 18 via switches 22 therein on the circuit board 20 send a second analog output signal 30 to the relay circuit 18.

The relay circuit 18 is electronically connected to the first and second PLC devices 14 and 16 and additionally the first and second backup PLC devices 26 and 28 and additionally electrically connected to the control device 12 to provide a circuit therebetween. Thus the relay circuit 18 can receive a control signal 32 from the control system and then based on the PLC devices 14 and 26 sends an analog output signal 24 to the control or field device 12. The relay circuit 18 additionally is electronically connected to a switching output device 34 having an additional backup card A such that the relay circuit 18 can receive an output signal from the control device 12.

In one embodiment a HART (highway addressable remote transducer) signal is sent from the control device 12 over the analog output for additional verification. In this manner the PLC device 14 and 16 are able to verify the output signal of both the PLC devices 14 and 16 and additionally the backup PLC devices 26 and 28 while at the same time verify the output signal after the signal is sent to the control device 12 to provide a load. Thus, improved functioning and control is provided.

Thus, presented is a method of using common PLC components as part of the invention to provide a robust analog output system that is redundant and highly effective at detecting analog output failures. The invention uses two standard analog outputs from two different PLC cards to drive the device. The analog output signal is passed through a relay circuit 18 which is used to direct which card is driving the control device. The analog signal is then returned to the relay circuit 18 and passed to another PLC card that is used to read the analog signal's value. In this way, the exact analog signal being passed to the field device 12 is monitored. In addition to this arrangement, the analog signal from the backup PLC card (the one that is not being currently used to drive the control device) is passed through the relay circuit 18 and directed to the backup PLC card used to read the backup analog signal. The relay circuit 18 is controlled by a digital output signal from the PLC system.

The advantage of this system over prior art systems is that the field signal, or signals sent by the control device, is tested after the load thus ensuring that higher percentage of field wiring related failures are detected by the system. In addition, the backup signal is passed through the relay circuit 18 and tested while the backup signal is not driving the load to ensure that the backup signal is accurate and ready to drive the load or control device when required. Another significant advantage is that this invention utilizes the use of standard PLC components augmented with a very simple and thus robust relay switching circuit to realize a highly reliable redundant analog output system.

In addition to this method of detecting failures of the analog output, the system is designed to allow the optional use of HART signals to enhance the abilities of the system to detect failures. This method includes the use of reading the signals that the field device received directly over the digital HART communications protocol.

Therefore, the objectives of this invention that are met include providing a redundant analog output signal to a control device such as a valve within a compressor. Another objective that is met is utilizing standard PLC components augmented with a very simple and thus robust relay switching circuit to realize a highly reliable redundant analog output system. Yet another objective met is to provide feedback of the analog output signal after the signal has passed through the control device and returned to the PLC system. This ensures that field wiring failures are correctly identified and safe actions are taken. Still another objective that is met is allowing for the optional use HART signals directly from the field device to validate the correct operation of the analog output signal.

It will be appreciated by those skilled in the art that other various modifications could be made to the device without departing from the spirit and scope of this invention. All such modifications and changes fall within the scope of the claims and are intended to be covered thereby.

What is claimed is:

1. A control system for operating a device in a turbo machine system comprising:
   a first programmable logic control device producing an analog output signal;
   a relay circuit electrically connected to the first programmable logic control device to receive the analog output signal;
   a field device electrically connected to the relay circuit to receive the analog output signal to operate based on the analog output signal;
   wherein the relay circuit is electrically connected to a second programmable logic control device to monitor the analog output signal; and
   wherein after the analog output signal passes through a load on the field device the analog output signal is received by the relay circuit to send to the second programmable logic control device.

2. The control system of claim 1 further comprising:
   a first backup programmable logic control device electrically connected to the relay circuit and producing an analog output signal; and
   a second backup programmable logic control device electrically connected to the relay circuit to receive the analog output signal of the first backup programmable logic control device.

3. The control system of claim 1 wherein the field device is a recycle valve in a compressor.

4. The control system of claim 1 wherein the second programmable logic control device detects wire failures.

5. The control system of claim 1 wherein the analog output signal is a highway addressable remote transducer signal.

6. The control system of claim 1 wherein the output signal passing through the field device is the exact signal that is monitored by the second programmable logic control device.

7. The control system of claim 1 wherein the analog output signal from the first programmable logic control device drives the field device unless a failure is detected and then the analog output signal from the first backup programmable control device drives the field device.

8. The control system of claim 1 wherein the output signal from the first programmable logic control device and the first backup programmable control device are sent to the relay circuit simultaneously.

9. The control system of claim 1 wherein the second programmable logic control device is testing the exact same output signal used to drive the field device.

10. The control system of claim 2 wherein the second backup programmable logic control device is testing the output signal from the first backup programmable logic control device while the output signal from the first backup programmable drive is not being used to drive the control device to ensure that the backup signal is accurate and ready to drive the control device when required.

11. A control system for operating a device in a turbo machine system comprising:
    a first programmable logic control device producing an analog output signal;
    a relay circuit electrically connected to the first programmable logic control device to receive the analog output signal;
    a field device electrically connected to the relay circuit to receive the analog output signal to operate based on the analog output signal;
    wherein the relay circuit is electrically connected to a second programmable logic control device to monitor the analog output signal; and
    wherein the field device produces a highway addressable remote transducer signal over the analog output for additional verification.

12. A control system for operating a device in a turbo machine system comprising:
    a first programmable logic control device producing an analog output signal;
    a relay circuit electrically connected to the first programmable logic control device to receive the analog output signal;
    a second programmable logic control device to monitor the analog output signal
    a first backup programmable logic control device electrically connected to the relay circuit and producing an analog output signal;
    a second backup programmable logic control device electrically connected to the relay circuit to receive the analog output signal of the first backup programmable logic control device;
    a field device electrically connected to the relay circuit to receive the analog output signal;

a control system electrically connected to the relay circuit to send a control signal to the relay circuit; and wherein the relay circuit receives the control signal from the control system and based on the output signal from the first programmable logic control device and first backup programmable logic control device sends the analog output signal to the field device to operate based on the analog output signal.

\* \* \* \* \*